July 20, 1954          E. PRICE          2,683,992
CONVERTIBLE MOTION TRANSMITTING MECHANISM
Filed Jan. 24, 1949          3 Sheets—Sheet 1
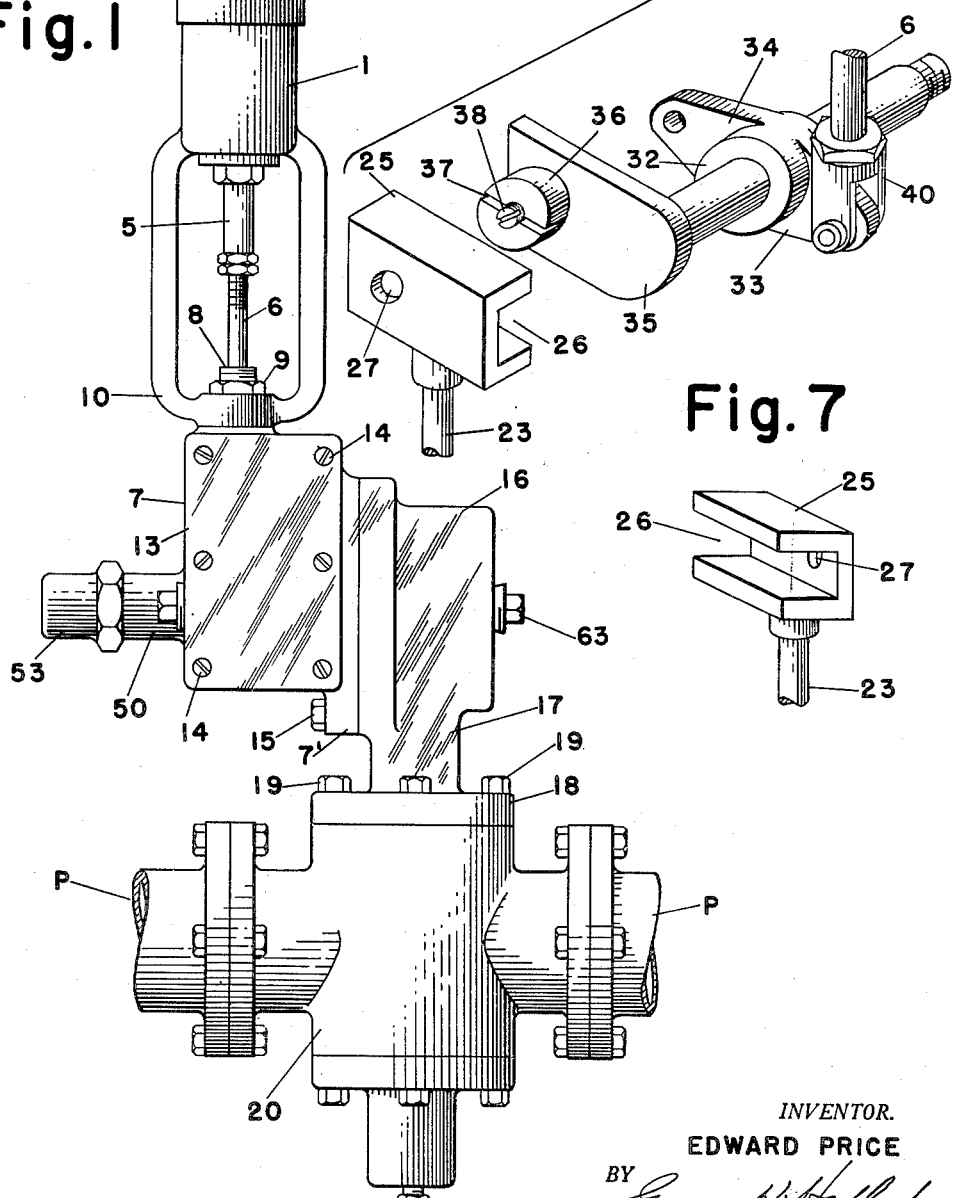
INVENTOR.
EDWARD PRICE
BY
ATTORNEY

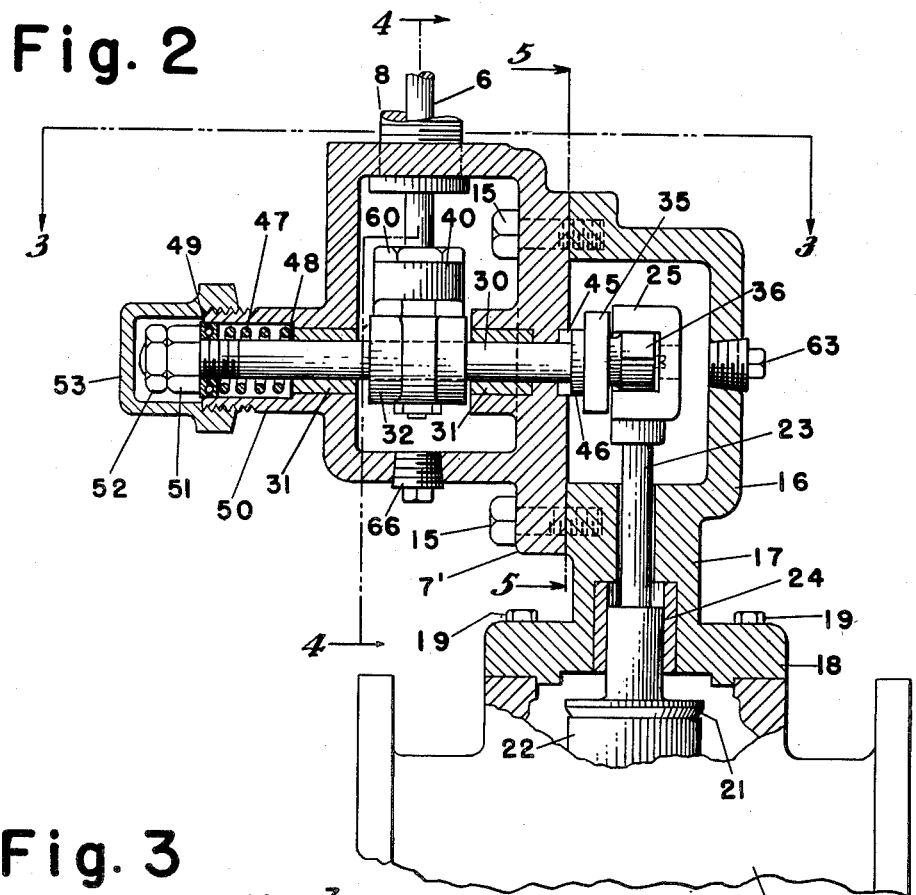

July 20, 1954  E. PRICE  2,683,992
CONVERTIBLE MOTION TRANSMITTING MECHANISM
Filed Jan. 24, 1949  3 Sheets-Sheet 3

*INVENTOR.*
EDWARD PRICE
BY
ATTORNEY

Patented July 20, 1954

2,683,992

UNITED STATES PATENT OFFICE 2,683,992

CONVERTIBLE MOTION TRANSMITTING MECHANISM

Edward Price, Springfield, Pa., assignor, by mesne assignments, to Minneapolis-Honeywell Regulator Company, Minneapolis, Minn., a corporation of Delaware Application January 24, 1949, Serial No. 72,435

4 Claims. (Cl. 74—110)

Diaphragm motor control valves of the general class to which my invention relates normally comprise an upper casing and housing respectively containing the diaphragm and its biasing spring, a lower housing connected with the upper one and containing the valve disk to be controlled and a valve stem extending from the valve disk to the diaphragm through which the movements of the latter are communicated to the former, and in order to prevent leakage from the lower housing about the stem the stem is surrounded by a long packing sleeve retained in place by the usual gland and follower. This construction, however, is not fully satisfactory since due to the wear of the packing sleeve the gland frequently must be adjusted to maintain the sleeve snugly about the stem and this adjustment must be performed to a nicety since if the gland be set up too tight the movement of the valve disk under the actuation of the motor becomes sluggish because of excessive friction between the packing and the stem whereas on the other hand if the gland be set up too loosely leakage occurs about the stem.

Moreover, in accordance with the specific character of the system in which the diaphragm motor control valve is installed, it may be necessary or desirable either that the valve disk be raised from its seat by the biasing spring upon diminution of air pressure behind the diaphragm so as to open the valve or else returned to its seat by the spring upon the occurrence of a similar condition so as to close the valve; in consequence to meet the requirements of customers the valve manufacturer thus has been faced with the necessity of providing two types of valves one of which is effective through the operation of the biasing spring to move the valve disk from its seat upon diminution in the air pressure acting on the diaphragm while the other is effective to seat the valve disk upon a like failure of pressure.

It is therefore a principal object of my invention to provide a diaphragm motor control valve devoid of the customary long valve stem packing with its associated gland and follower yet which is so constructed as to prevent leakage from the chamber housing the valve disk and which requires no periodic and accurate adjustment.

A further object is the provision of such valve which by a simple transposition of certain of its elements, readily effected at any time and so either preparatory to its initial installation or subsequently thereto should conditions of use require, can be made effective to either seat the valve disk or move it from its seat upon the diminution of the air pressure acting on the diaphragm, thus relieving the valve manufacturer of the present necessity of producing two different types of valves respectively adapted to actuate the disk in one direction or the other when the said air pressure is reduced.

Other objects, advantages and novel features of design, construction and arrangement comprehended by my invention are hereinafter more particularly pointed out or will be apparent to those skilled in the art from the following description of a diaphragm motor control valve constructed in accordance therewith and illustrated in the accompanying drawings in which:

Fig. 1 is a front elevation of the valve as installed in a pipe line for controlling the flow of fluid therethrough;

Fig. 2, on a scale larger than Fig. 1, is a central vertical section substantially on line 2—2 in Fig. 3 through the lower housing of the valve and adjacent parts, certain of which are shown in elevation;

Fig. 3 is a top plan view of certain of the parts shown in Fig. 2 substantially on the plane of line 3—3 in that figure;

Fig. 6 is an exploded view in perspective showing the valve disk actuating crank and certain parts associated therewith; and Fig. 7 is a fragmentary perspective view of the slide block and upper end of the valve disk stem.

Figure 4:
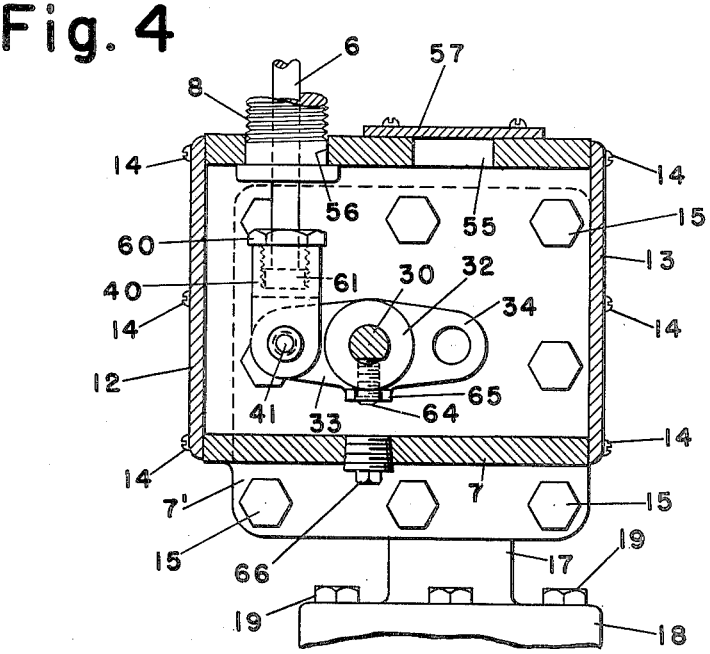
Fig. 4 is a vertical section on the line 4—4 in Fig. 2.
Figure 5:
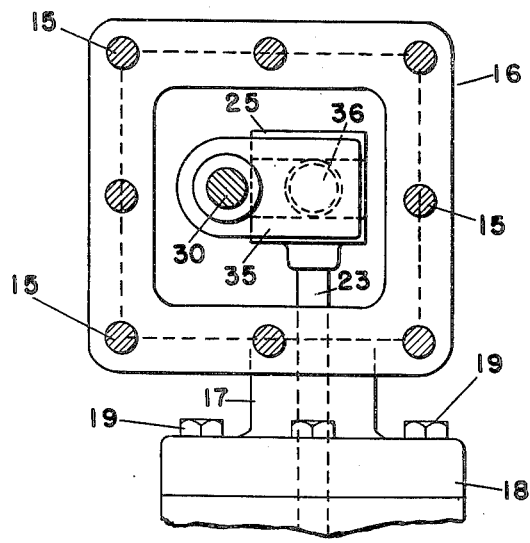
Fig. 5 is a similar section on line 5—5 in said figure.

Referring now more particularly to the drawings, the valve in general comprises an upper housing 1 supporting the diaphragm casing 2 across which extends the diaphragm 3, the diaphragm biasing spring (not shown) being contained in the lower part of the housing in the usual way, a pipe 4 entering the casing above the diaphragm being extended to the actuating air or other fluid supply in the usual way. Depending from the diaphragm and surrounded by the spring is the customary stem desirably made in two sections 5, 6 suitably coupled together, the lower section passing into the lower housing 7 through an externally threaded bushing 8 carrying a nut 9 seated on an open yoke 10 depending from the upper housing; as shown in Figs. 2 and 4 this bushing at its lower extremity has an outwardly projecting flange which when nut 9 is set up is drawn against the inner face of the lower housing whereby the latter is held firmly to the bracket, the construction so far described thus approximating that of diaphragm motor control valves presently in use.

The lower housing 7 is of generally box-shape form and open at its end which is respectively closed under operative conditions by plates 12, 13 removably secured in position by suitable fastening screws 14 so that by taking off one or both plates access can readily be had to the interior of the housing. Depending from one side of the latter is a flange 7' through which as well as through the superjacent wall are extended bolts 15 which removably secure to the outer face of the housing a bonnet 16 having a depending neck 17 with a flange 18 at its lower end which seats on and is removably secured as by bolts 19 to a valve body 20 of customary design and so provided with flanges at its extremities for the reception of corresponding flanges on the adjacent sections of pipe P in which the body is disposed and the fluid flow through which the diaphragm motor control valve is intended to regulate.

A valve disk 21 is located in a chamber within the valve body for cooperation with a seat 22 in such way that when it is closed on the latter as in Fig. 3 the flow through pipe P is cut off and as the disk is raised from the seat the flow is progressively increased in the ordinary way. The disk is secured at the lower end of a stem 23 which is freely slidable through a suitable bore in neck 17 of bonnet 16, the stem being desirably enlarged proximate the disk so as to afford additional bearing surface against a bushing 24 located in the lower part of the neck, while within the bonnet the upper end of the stem is secured to a block 25 having a transverse groove 26 extending from one end of the block to the other and open at one side as best shown in Fig. 7.

Extending horizontally through the lower valve housing 7 is a crank shaft 30 forming a good rotative fit in bushings 31 seated in the housing, the axis of this shaft being offset from that of stem 23 but intersecting the axis of stem 6. As best shown in Fig. 6 the crank shaft in alignment with the last mentioned axis carries a hub 32 from which oppositely disposed arms 33, 34 extend diametrically outward, each arm being provided with a hole near its extremity; these arms are preferably formed integral with the hub. At its end proximate stem 23 shaft 30 is provided with a crank 35 from the outer face of which projects a cylindrical boss 36 desirably integral with the crank and preferably provided with a diametric slot 37 extending inwardly from its outer face for a suitable distance and also with an axial internally threaded tapered bore likewise extending inwardly from said face for reception of correspondingly tapered adjusting screw 38 for a purpose which will hereinafter appear. The diameter of boss 36 is such it will form a good sliding fit in groove 26 of block 25 in which it seats when the parts are assembled.

To effect oscillation of crank shaft 30 in accordance with the movements of stem 6, the lower end of the latter is provided with a clevis 40 which may be connected to either of arms 33, 34 through the medium of a removable pin 41 which bottoms at one end against a shoulder in the bore in the clevis after it is inserted therein through a hole in the housing wall normally closed by a removable plug 42. Thus when the clevis is connected as shown in the drawings an upward movement of stem 6 will turn crank shaft 30 counter clockwise (when viewed as in Fig. 4) and correspondingly depress block 25, stem 23 and valve disk 21 so as to move the latter toward and ultimately close it on its seat.

To insure against leakage from the interior of bonnet 16 along shaft 30, the latter adjacent the crank is surrounded by a small ring 45 of suitable packing disposed in a counterbore in the proximate wall of the lower valve housing for engagement by a collar 46 integral with the shaft, and for holding this collar in snug engagement with the packing automatically the opposite end of the shaft is surrounded by an expansion spring 47 disposed between a washer 48 and a suitable thrust bearing 49 located in a bore in a boss 50 projecting from the opposite wall of the housing, the extremity of the shaft being threaded and provided with a nut 51 engaging the thrust bearing at one end and held in position by a lock nut 52 in turn engaging its other end. The extremity of the boss is externally threaded for the reception of a dust cap 53.

Mention has been made of the fact that my improved valve can readily be arranged either to move valve disk 21 toward its seat upon an appreciable decrease in the normal air pressure in the chamber above diaphragm 3 as heretofore described or to move the valve disk away from its seat upon a similar decrease in that pressure in accordance with the requirements of the particular installation in which the valve is to be used. To this end the top wall of lower valve housing 7 is provided with a second opening 55 corresponding to that through which bushing 8 is shown as extending and which is designated as 56, opening 55 being aligned with the hole in arm 34 just as opening 56 is aligned with the hole in arm 33. Opening 55 is normally closed in any convenient way as, for example, by a removable cover plate 57. As heretofore pointed out, when the parts are assembled as shown in the drawings, that is with the clevis pin 41 extending through the hole in arm 33, upon decrease in air pressure above the diaphragm the biasing spring in the upper valve housing will turn the crank shaft in a direction effective to close valve disk 21 toward its seat, but if it be desired to have the spring operate to move the valve away from its seat, it is only necessary to shift bushing 8 into opening 55 and transfer the cover plate 57 or other closing means to opening 56, which can be readily accomplished in the following way: Lock nut 9 is first backed off so as to free bushing 8 and plates 12, 13 are removed to permit access to the interior of housing 7 so that pin 41 can be withdrawn to free the clevis from arm 33. The clevis 40 is removably secured to the lower end of stem 6 in any suitable way, preferably and as shown by a bushing 60 surrounding the stem and threaded into a bore in the clevis so it may be screwed to abut a flange 61 on the end of the stem and hold it against the bottom of the bore; thus by backing off this bushing the stem can be separated from the clevis. Then by uncoupling the two sections of the stem the lower housing can be separated from yoke 10 and when bushings 8 and 60 are slid down on the stem as far as they will go, the stem may be drawn angularly through opening 56 until clear of the housing preparatory to passing it upwardly in reverse direction through opening 55, from which plate 57 has been removed, until bushing 8 can be seated therein and the parts reassembled by a substantially reverse series of operations with the clevis receiving arm 34 and the clevis pin 41 passing through the hole in that arm. Then, as will readily be apparent, upon a material decrease in pressure above the diaphragm the biasing spring will turn crank 30 in a direction effective to cause valve disk 21 to recede from its seat toward full open position. The valve can thus be conveniently and quickly conditioned for either character of operation which may be required by the particular installation in which it is to be employed.

It will be further evident that in accordance with my invention the usual long packing sleeve enclosing the lower part of the stem operated by the diaphragm and spring is entirely absent and even though spring 47 be adjusted so as to cause collar 46 to bear very snugly against the small ring of packing 45 the friction exerted between the packing collar and crank shaft is substantially negligible in its effect on the sensitivity of the valve, that is, its ability to vary the position of valve disk 21 on relatively slight changes in the actuating air pressure, while the capacity of the spring to constantly maintain a sealing engagement between the collar and packing insures against leakage from inside bonnet 16 in which, of course, the fluid pressure is similar to that in pipe P. Moreover the construction is such that lower housing 7 may be constantly kept nearly full of oil so as to insure adequate lubrication of the working parts at all times and thereby materially contribute to the operative life of the valve as a whole and obviate the necessity for periodic lubrication except at very long intervals.

While the relative movement under normal conditions of operation between boss 36 and block 25 is comparatively slight so that the wear between the parts is almost negligible, nevertheless the provision of the slot and the tapered adjusting screw in the boss, of which mention has been made, is desirable in that if wear does occur after a long period it may be compensated by forcing the screw inwardly a little so as to slightly expand the boss. To enable this operation to be effected the wall of the bonnet is provided with a hole substantially aligned with hole 27 in block 25 and normally closed with a removable plug 63 so that by taking out the plug a screw driver can be inserted through the block to enable the screw to be turned. Likewise, to facilitate assembly arms 33, 34 and their hub 36 are preferably made integral and, as best shown in Fig 4, crank shaft 30 flattened on its under side proximate the zone in which the arms are to be seated so that a set screw 64 carrying a lock nut 65 can be screwed through a threaded bore in the hub and arm assembly against the flat on the shaft, an opening in the bottom wall of housing 7 normally closed by a removable plug 66 permitting introduction of tools suitable to force the set screw home and tighten the nut.

It will now be apparent that a valve constructed in accordance with my invention embodies many features of advantage over the customary diaphragm motor control valves which contribute not only to its adaptability to installation in conformity with different operating conditions but to its long life and satisfactory performance with a minimum of attention.

While I have herein illustrated and described with considerable particularity one form of valve constructed in accordance with the invention, I do not thereby desire or intend to specifically restrict or confine myself thereto as its component parts are capable of numerous changes and modifications in design, construction and assembly without departing from the spirit and scope of the invention as defined in the appended claims.

Having thus described my invention, I claim and desire to protect by Letters Patent of the United States:

1. In a device for transmitting to a valve disk the motion of a fluid-pressure-responsive motor, that improvement comprising, a casing having an aperture in one wall thereof, a housing adapted to contain lubricant, said housing having in one of its walls facing the apertured casing wall two substantially similar openings, means operable to connect the housing to the casing removably with either opening in substantial axial alignment with the aperture, a bushing adapted to extend through either of said openings, a stem projecting through the aperture and adapted to pass through the bushing into the housing when the bushing is disposed in whichever opening is substantially coaxial with the aperture, the bushing forming part of said connecting means, a chambered bonnet adjacent and removably attached to the housing, a crank shaft extending transversely through the housing into the bonnet and having a pair of diametrically extending arms within the housing with their respective extremities substantially aligned with said openings, a crank on the shaft within the chamber in the bonnet, a reciprocable stem extending into the bonnet, means movably connecting the crank with the second mentioned stem and adapted to convert rotative movement of the crank shaft into linear movement of the second mentioned stem, means for selectively and movably connecting that end of the first mentioned stem within the housing with either of said arms in accordance with the positioning of the bushing in said openings, and removable means closing the unoccupied opening whereby, when the parts are operatively assembled with the bushing disposed in one opening, longitudinal movement of the first mentioned stem will cause the second mentioned stem to move in the same direction and, with the bushing disposed in the other opening, a like movement of the first mentioned stem will cause the second mentioned stem to move in the opposite direction.

2. In a device for transmitting to a valve disk the motion of a fluid-pressure-responsive motor having a diaphragm biasing spring, that improvement comprising, a casing having an aperture in one wall thereof, a housing spaced from the casing and adapted to contain lubricant and having in its wall adjacent the latter two substantially similar openings, a bushing selectively disposable in either of said openings, a first stem projecting through the aperture and adapted to pass through the bushing when the housing is positioned to bring the bushing, when disposed in either opening, into substantial axial alignment therewith, a bonnet attached to the housing providing an interior chamber, a second stem extending thereinto in parallelism with the first stem, a crank shaft extending through the housing and into the bonnet at right angles to said stems, a crank on the shaft proximate the second stem, means connecting the latter and the crank and adapted to convert rotative movement of the crank shaft into axial movement of the second stem, a collar on the crank shaft, a packing ring encircling the shaft and seated in the wall of the housing proximate said collar, spring means associated with the opposite end of the crank shaft operative to constantly bias the collar against the packing ring to prevent leakage from the bonnet along the shaft, a pair of diametrically opposed arms projecting from the shaft within the housing and having their extremities respectively substantially aligned with said openings, and means operative to removably connect the proximate end of the first stem with either arm in accordance with the position of the bushing with respect thereto whereby, when such connection is made with one arm, a longitudinal movement of the first stem under the influence of the diaphragm biasing spring will cause movement of the second stem in the same direction and, when the connection is made to the other arm, a like movement of the first stem will cause movement of the second stem in the opposite direction, and means cooperative with the bushing for separably connecting the housing with the casing.

3. In a device for transmitting to a valve disk mounted on a second stem the motion of a fluid-pressure-responsive motor having a first stem mounted on a diaphragm, that improvement comprising, a chambered bonnet having the second stem projecting thereinto, a crank shaft extending transversely of said stems and into said chamber, a crank on the shaft, means interconnecting the crank with the second stem whereby oscillation of the crank is operative to impart axial movement to the second stem, a pair of arms extending in diametrically opposite directions from the crank shaft, and means operable for interchangeably and selectively connecting either arm with the first stem whereby, when one of the arms is so connected, the movement of said first stem in one direction is effective to move the second stem in a corresponding direction and, when the other arm is so connected, a movement of the first stem in like direction is effective to move the second stem in the opposite direction.

4. In a device for transmitting to a valve disk mounted on a second stem the motion of a fluid-pressure-responsive motor having a first stem mounted on a diaphragm, that improvement comprising, a crank shaft extending transversely of said first stem, means connecting the crank shaft with the first stem, a crank on the shaft, means operative to convert rotative movement of the crank shaft into linear movement of the second stem comprising a grooved block on the second stem, a cylindrical diametrically slotted boss on the crank engaging in said groove, and a tapered screw extending through the slot and into the boss adjustable to expand the boss within the groove to compensate for wear between the parts, said block provided with an opening aligned with the screw to enable its adjustment from the non-grooved side of the block when the boss is seated in the groove.

References Cited in the file of this patent

UNITED STATES PATENTS

| Number | Name | Date |
|---|---|---|
| 170,122 | Snitzer | Nov. 16, 1875 |
| 245,771 | Bond | Aug. 16, 1881 |
| 1,189,950 | Hunter | July 4, 1916 |
| 1,577,498 | Spinney | Mar. 23, 1926 |
| 1,716,705 | McEwan | June 11, 1929 |
| 1,841,901 | Mabey | Jan. 19, 1932 |
| 1,974,749 | McAvinney | Sept. 25, 1934 |
| 2,017,317 | Magney | Oct. 15, 1935 |
| 2,159,979 | Parsons | May 30, 1939 |

FOREIGN PATENTS

| Number | Country | Date |
|---|---|---|
| 695,014 | France | Sept. 23, 1930 |